United States Patent [19]

Matsuda

[11] Patent Number: 4,680,150

[45] Date of Patent: Jul. 14, 1987

[54] METHOD FOR MANUFACTURING FOAMED PLASTICS

[75] Inventor: Hiromichi Matsuda, Nagoya, Japan

[73] Assignee: Inoue MTP Kabushiki Kaisha, Aichi, Japan

[21] Appl. No.: 760,806

[22] Filed: Jul. 30, 1985

[30] Foreign Application Priority Data

Jan. 31, 1985 [JP] Japan .................................. 60-18418

[51] Int. Cl.⁴ ........................ B29C 67/22; B29C 65/30
[52] U.S. Cl. .................... 264/26; 264/46.4; 264/46.6; 264/54; 264/266; 264/271.1
[58] Field of Search ................. 264/25, 26, 46.4, 46.6, 264/54, 266, 271.1

[56] References Cited

U.S. PATENT DOCUMENTS

| | | | |
|---|---|---|---|
| 2,247,337 | 6/1941 | Raplovich | 264/46.4 |
| 2,743,931 | 5/1956 | Pooley et al. | 264/54 X |
| 2,753,642 | 7/1956 | Sullivan | 264/54 X |
| 3,248,461 | 4/1966 | Wiles et al. | 264/25 X |
| 3,345,439 | 10/1967 | Everard et al. | 264/26 |
| 3,354,243 | 11/1967 | Dodge | 264/25 |
| 3,379,799 | 4/1968 | Goldman | 264/26 |
| 3,420,923 | 1/1969 | Ashworth et al. | 264/26 |
| 3,444,275 | 5/1969 | Willett | 264/26 |
| 3,478,134 | 11/1969 | Gruss et al. | 264/46.4 |
| 3,816,574 | 6/1974 | Heller, Jr. et al. | 264/26 X |
| 3,937,774 | 2/1976 | Wiley et al. | 264/26 |
| 4,110,139 | 8/1978 | Mashida et al. | 264/26 X |
| 4,124,670 | 11/1978 | Cecka et al. | 264/46.4 X |
| 4,129,634 | 12/1978 | Cecka et al. | 264/46.4 X |

OTHER PUBLICATIONS

*The Condensed Chemical Dictionary*, Tenth Edition revised by Gessner G. Hawley, New York, Van Nostrand Reinhold, ©1981, p. 99.

*Primary Examiner*—Philip Anderson
*Attorney, Agent, or Firm*—Armstrong, Nikaido, Marmelstein & Kubovcik

[57] ABSTRACT

A method for manufacturing a predetermined shape of molded plastics, comprising the steps of introducing a foamable shell forming material in molding dies, introducing a hard core forming material having a foaming agent on the shell forming material, clamping the molding dies together, and heating both the material located in the molding dies by an induction heating.

9 Claims, 3 Drawing Figures

METHOD FOR MANUFACTURING FOAMED PLASTICS

BACKGROUND OF THE INVENTION

1. Field of the Invention

The present invention relates to a method for manufacturing foamed plastics and particularly to a method in which a plastic material is molten and plasticized by induction heating and a foaming agent contained in the plastic material is dissolved to form a plastic product of a predetermined shape.

2. Description of the Related Art

A molded product made of foamed plastics, such as an elongated strip of a decorative and protective molding which can be attached to a side panel or a door panel of an automobile is light in weight and has a large shock-absorbing effect, in comparison with a solid molding.

This sort of foamed plastic molding can be made in a process wherein a piece of raw material which consists of a resin material with a foaming agent mixed therein is introduced in molding dies which are provided with high frequency electrodes, and is heated by an induction heating process to melt and plasticize it, so that the foaming agent contained in the resin material is dissolved, resulting in the production of a plastic molding having a predetermined shape.

The plastic molding thus obtained has the largest cell construction at its interior center core portion, since the interior foaming agent dissolves and foams when heated by the application of high frequency voltage. On the other hand, the outer surface of the plastic molding forms a hard and dense shell. Accordingly, the plastic molding as mentioned above can be advantageously used as a decorative and protective molding for an automobile.

However, in the plastic molding, if the foaming agent has a large extent of foaming or a high expansion coefficient, the interior foams cause the outer shell to expand, thus resulting in the appearance of a rough skin which is not desireable in a decorative molding for an automobile.

It will be noted that the foaming agent used to make decorative and protective molding for an automobile usually has a high expansion coefficient to provide an inexpensive molded product having a high shock-absorbing or damping effect. The rough skin results in an unacceptably bad appearance for the molding product and cancels the peculiar advantages of the plastic molding as mentioned above and, thereby, decreases the practicabilty of the plastic molding.

SUMMARY OF THE INVENTION

The primary object of the present invention is, therefore, to provide an improved method for manufacturing foamed plastics which present a good appearance without being influenced by the interior foams, even if a foaming agent having a high expansion coefficient is used.

Another object of the present invention is to provide an improved method for manufacturing foamed plastics, in which a raw plastic material is heated by the application of a high frequency voltage to melt and plasticize it, so that a foaming agent contained in the raw material is dissolved, thus resulting in the production of foamed plastics of a predetermined shape.

Still another object of the present invention is to provide a method for manufacturing foamed plastics made from a flowable shell forming material and a core forming material having a foaming agent which foams when heated.

Still another object of the present invention is to provide a method for manufacturing a plastic molding which is made of a predetermined shape of foamed core and hard shell.

To achieve the objects mentioned above, according to the present invention, there is provided a method for manufacturing foamed plastics of a predetermined shape, by heating a raw plastic material in molding dies by an induction heating process to melt and plasticize it and to dissolve a foaming agent contained in the plastic material, wherein the method comprises introduction of a flowable shell forming material in the molding dies, then introducing a core forming material which contains a foaming agent and which can maintain its original shape without collapsing, clamping the molding dies, and molding the shell forming material and the core forming material into a molded product of a predetermined shape by the application of a high frequency voltage thereto.

Namely, in the present invention, the core forming material containing the foaming agent is put in the shell forming material having a flowability within the molding dies and is then heated in an induction heating process to melt and plasticize the same, so that the foaming agent foams and expands. Due to the expansion, the flowable shell forming material flows in the molding dies and surrounds the core forming material, so that the shell and the core are molded together into a product of a predetermined shape.

Generally, when a high frequency voltage is applied to opposed electrodes in which an dielectric subject to be heated is located, the calorific value is proportional to a squared voltage applied. When there is an air gap between the opposed electrodes, the voltage applied to the subject is substantially in inverse proportion to the distance of the air gap, as is well known. Therefore, in the present invention, when the flowable shell forming material which is located in the molding dies with high frequency electrodes and the foamable core forming material which can self-maintain its original shape when it is located in the shell forming material are heated by a high frequency power, the core forming material which is located in the shell forming material and which projects upward from the latter is first heated prior to the shell forming material, since the air gap between the core forming material and the opposed electrode is smaller than that between the electrode and the shell forming material.

Accordingly, the expansion of the core forming material takes place due to the dissolution of the foaming agent contained in the core forming material, so that the flowable shell forming material which is also heated flows to surround the core forming material into a predetermined shape.

Thus, according to the present invention, a molded product having a predetermined shape and having a hard shell and a foamed inner construction can be obtained.

BRIEF DESCRIPTION OF THE DRAWINGS

The invention will be described below in detail with reference to the accompanying drawings, in which.

DESCRIPTION OF THE PREFERRED EMBODIMENT

Figure 1:
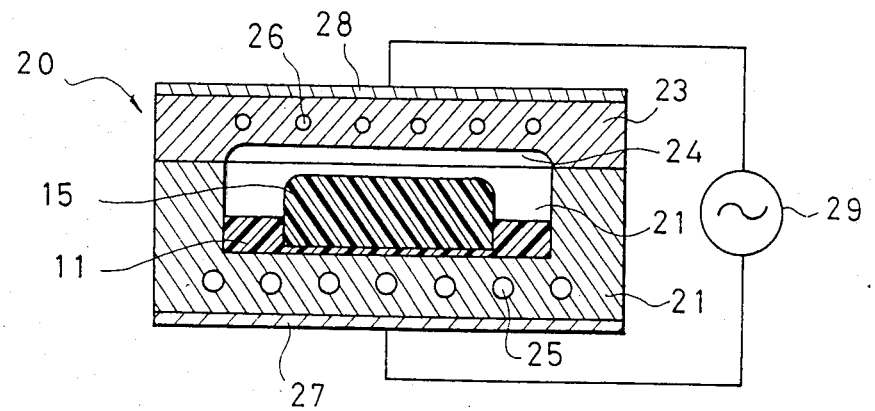
FIG. 1 is a sectional view of molding dies in which the shell forming material and the core forming material are located to be subject to an induction heating.
Figure 2:
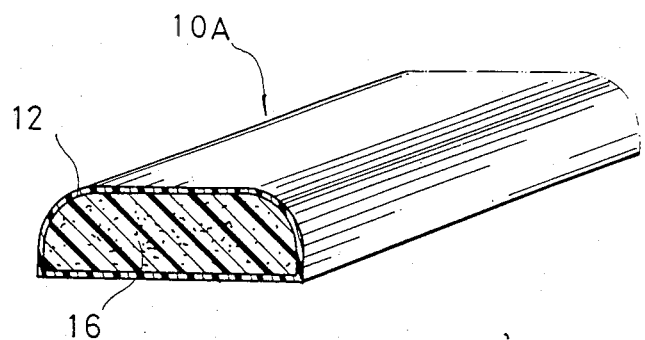
FIG. 2 is a partial perspective view of a plastic molding for an automobile obtained according to the present invention; and, FIG. 3 is a partial perspective view of a variant of a plastic molding obtained by the present invention.
Figure 3:
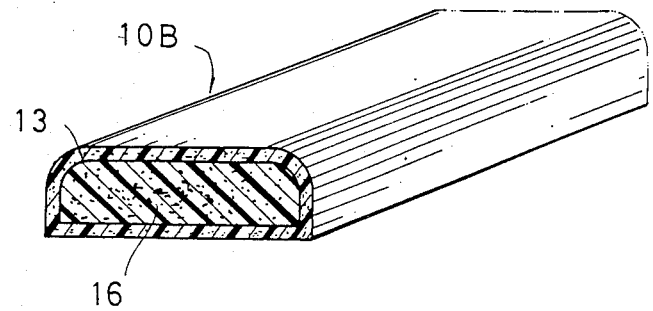

In FIG. 1, the molding dies 20 has an upper die 23 having an upper cavity 24, and a lower die 21 having a lower cavity 22. The molding dies 20 are adapted to mold plastic 10A and 10B for an automobile, as shown in FIGS. 2 and 3, respectively.

The upper and lower dies 21 and 23 are made of a material which has a small dielectrical loss, such as silicone resin or fluorocarbon resin, and have electrode plates 27 and 28 which are electrically connected to a high frequency power supply 29, respectively.

The numerals 25 and 26 designate cooling pipes in which a coolant, such as a water passes to cool the dies. The number of the cooling pipes 25 and 26 is not limited to those illustrated in the drawing.

In the lower cavity 22 of the lower die 21 is located a material 11 of which an outer shell of a plastic molding is made. The shell forming material 11 is based on a plastic having a polar radical, such as polyvinylchloride and preferably has an additive of a liquid plasticizer to make the shell forming material liquid or pasty in order to provide a flowability to the shell forming material.

The foamable core forming material 15 which forms the core of a plastic molding is located in the shell forming material 11 in the lower cavity 22, so that the core forming material projects upward from the shell forming material 11. The core forming material 15 is based on a plastic material having a polar radical, such as polyvinylchloride or the like and has a chemical foaming agent or other additives mixed therein, so that the core forming material 15 has a hardness enough to maintain its original shape without flowing or collapsing. The term "flowability" or "flowable" referred to hereinabove and hereinafter means a flowability at a normal state of the shell forming material without being heated. Namely, the flowability of the shell forming material enables it to flow in the molding dies 20 when it is subject to an external force by the core forming material, i.e. when it is forced out by the core forming material. Generally, the flowable shell forming material is in a liquid or paste state, having a viscosity below 100,000 centipoise (cP), preferably below 50,000 cP.

On the other hand, the term "hardness enough to maintain its original shape" referred to hereinbefore means that the core forming material can be located in an upstanding state without deforming or collapsing, in or on the shell forming material in the course of the molding operation. Namely, the core forming material 15 is hard enough to have a predetermined shape in its free state. Generally, the core forming material is a highly viscous sol or solid. In other words, the core forming material has preferably a viscosity above about 100,000 cP.

It should be noted that so long as the foamable core forming material 15 satisfies the requirement of hardness enough to maintain its shape, a liquid plasticizer or other additives can be mixed therewith.

For example, the core forming foamable material consists of a base resin of polyvinylchloride (PVC), a liquid plasticizer, a stabilizer, a chemical foaming agent which will be discussed below, and an additive, such as pigment or the like, mixed in the base resin. Preferably, the core forming foamable material as mentioned above is premolded in a predetermined shape substantially corresponding to the shape of the cavity of the molding dies, for example by an extrusion molding process or a calender molding machine per se known.

It is also possible to add a forming agent to the shell forming material 11, if necessary. When a foaming agent is added to the shell forming material, the foaming agent has preferably a dissolution temperature, the foaming agent mixed in the core forming material 15. In addition to the foregoing, preferably, the amount of the foaming agent to be mixed in the shell forming material is smaller than that of the foaming agent mixed in the core forming material 15.

The chemical foaming agent used in the present invention can be azocompounds producing nitrogen gas, such as azodicarbonamide, azobisisobuthylene nitrile, or the like, or nitroso compounds, such as dinitropentamethylenetetramine, or hydrazide compounds, such as P,P'-oxybisbenzenesulfonylhydrazide, or carbonates or dicarbonates producing carbon dioxide. It goes without saying that the amount of the foaming agent to be mixed depends on the required extent of expansion of the core forming material.

As additives, plasticizers and stabilizers can be used such as dioctyl phthalate (DOP) or barium, and zinc stabilizer which are all avilable on the market, respectively.

The decorative and protective plastic molding for an automobile can be made of molding materials in the following process.

A predetermined amount of flowable shell forming material 11 which is pasty is first introduced in the lower cavity 22 of the lower die 21. Due to the flowability of the shell forming material, it spreads over the bottom of the lower cavity 22, namely lies in the lower portion of the lower cavity 22. Then, the foamed forming material 15 is located on the shell forming material 11 substantially at the center portion of the latter, so that the core forming material 15 is upstanding on the shell forming material 11 and projects upward therefrom. When the core forming material is located on the shell forming material 11, the flowable shell forming material 11 is expelled outward in the lower cavity 22, so that the shell forming material 11 surrounds the core forming material at least at the lower portion of the latter.

After that, the upper die 23 is put on the lower die 21 and clamped to form a closed cavity consisting of the lower and upper cavities 22 and 24, and the high frequency voltage is applied to the electrodes 27 and 28, of the dies 21 and 23. By the application of the high frequency power, the plastic material in the cavity is heated and plasticized. It should be noted that the air gap between the upper surface of the core forming material 15 and the upper surface of the upper cavity 24 is smaller than that between the upper surface of the shell forming material 11 and the upper surface of the upper cavity 24, as shown in FIG. 1, and, accordingly, the core forming material 15 is first heated prior to the shell forming material 11. When the core forming material 15 is heated and molten, the chemical foaming agent contained in the core forming material dissolves, resulting in a volumetric expansion of the core forming material.

The expansion of the core forming material causes the shell forming material to flow in the cavity and to surround the entirety of the core forming material 15. The shell forming material which surrounds the core forming material is molded integrally with the core forming material.

FIGS. 2 and 3 show two examples of plastic moldings 10A and 10B obtained by the aforementioned process.

It should be noted that although the shell 12 (FIG. 2) or 13 (FIG. 3) is drawn as being clearly distinct from the foamed core 16, the distinction therebetween does not actually appear clearly. The shell 12 of the molding 10A shown in FIG. 2 is made of a non-foamed material, and the shell 13 of the molding 10B shown in FIG. 3 is made of a low foamed material.

The following are examples of compositions of the moldings 10A and 10B mentioned above.

| | (parts by weight) |
|---|---|
| COMPOSITION 1 | |
| plastic molding 10A (having a non-foamed shell) | |
| (1) foamed core forming material | |
| polyvinylchloride resin | 100 |
| dioctyl phthalate (DOP) | 10 |
| epoxy plasticizer | 5 |
| barium and zinc stabilizer | 5 |
| azodicarbonamide | 5 |
| (2) shell forming material | |
| polyvinylchoride resin (for paste) | 100 |
| dioctyl phthalate (DOP) | 60 |
| monoester plasticizer | 10 |
| barium, tin stabilizer | 2 |
| pigment | predetermined amount |
| (apparent specific gravity: 0.46) | |
| COMPOSITION 2 | |
| plastic molding 10B (having low foamed shell) | |
| (1) foamed core forming material | |
| same as the foamed core forming material in the COMPOSITION 1. | |
| (2) shell forming material | |
| polyvinylchloride resin (for paste) | 100 |
| dioctyl phthalate (DOP) | 60 |
| bipolymeric ester plasticizer | 10 |
| epoxy plasticizer | 10 |
| barium and zinc stabilizer | 3 |
| azodicarbonamide | 1 |
| pigment | predetermined amount |
| (apparent specific gravity: 0.40) | |

As can be seen from the above discussion, in a process for manufacturing a predetermined shape of molded product in which a plastic material is molten and plasticized in molding dies by an induction heating, resulting in the dissolution of a foaming agent contained in the plastic material, according to the present invention, a flowable shell forming material is introduced in the molding dies and then a foamed core forming material which has a hardness enough to maintain its original shape and which contains therein a foaming agent is located in the shell forming material, and, finally, the core forming material and the shell forming material are heated by a high frequency power after the molding dies are clamped.

Therefore, according to the present invention, since the foamed core is surrounded and covered by the shell, the outer surface of the molded product is free from the aforementioned disadvantage that the outer surface tends to become a rough skin due to the expansion of the core forming material, even when the core forming material containing a foaming agent having a high expansion coefficient is used. In addition to the foregoing, according to the present invention, a desired surface appearance, such as a lusterless surface, or a metalic surface can be obtained by properly selecting the material which forms the shell of the molded product. Accordingly, according to the present invention, a foamed plastic product, such as a decorative and protective plastic molding for an automobile having a good appearance and a highly foamed inner construction can be easily obtained. The molding for an automobile, obtained by the present invention is light in weight, useful, good to the touch, and inexpensive in manufacturing cost, and also has a high shock-absorbing effect, in comparison with conventional moldings.

Furthermore, according to the present invention, a desired appearance for the product can be obtained, so that a core forming material which has any extent of foaming can be used.

What is claimed is:

1. A method for manufacturing molded plastics having a predetermined shape by heating a plastic raw material which is located in molding dies having electrodes by applying high frequency voltage to the electrodes to melt and plasticize the plastic raw material, so that a foaming agent contained in the plastic material dissolves, wherein said method comprises; introducing a flowable shell forming material in the molding dies and introducing a core forming material having a foaming agent mixed therein in or on the shell forming material so that the core forming material is upstanding in the molding dies, said core forming material having a hardness which is sufficient to maintain its original shape when it is located in or on the shell forming material; clamping the molding dies together; and initially heating the shell forming material and subsequently the core forming material by the application of high frequency voltage thereto until the core forming material foams, enlarges in size and forces the shell forming material to flow in the mold cavity and surround the foamed core to form a molded composite foamed resin article.

2. A method according to claim 1, wherein said shell forming material has a viscosity below 100,000 centipoise.

3. A method according to claim 1, wherein said shell forming material is made of polyvinylchloride paste.

4. A method according to claim 1, wherein said shell forming material has a foaming agent mixed therein.

5. A method according to claim 1, wherein said core forming material is a highly viscous sol having a viscosity above 100,000 centipoise.

6. A method according to claim 1, wherein said core forming material is a solid which is premolded into a predetermined shape.

7. A method according to claim 1, wherein said core forming material has a base resin consisting of polyvinylchloride.

8. A method according to claim 1, wherein said core forming material is located in the shell forming material so as to project upward form the latter, so that the upper surface of the core forming material is located close to the upper surface of a cavity defined in the molding dies.

9. A method according to any one of the preceding claims, wherein said molded plastics are decorative and protective moldings for an automobile.

* * * * *